United States Patent [19]
Cheng

[11] Patent Number: 5,941,493
[45] Date of Patent: *Aug. 24, 1999

[54] LCD SUPPORT SYSTEM

[75] Inventor: Yung-Long Cheng, Taipei, Taiwan

[73] Assignee: ADI Corporation, Taichung Hsien, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 08/872,152

[22] Filed: Jul. 10, 1997

[30] Foreign Application Priority Data

Nov. 16, 1996 [TW] Taiwan .................. 85217568

[51] Int. Cl.⁶ .................................................. A47G 29/00
[52] U.S. Cl. ........................... 248/371; 248/923; 361/681
[58] Field of Search ...................... 248/371, 349, 248/393, 395, 397, 398, 178, 181.1, 348, 299, 917, 919, 922, 923, 292.12; 297/313, 314, 322, 323, 325, 317; 361/681

[56] References Cited

U.S. PATENT DOCUMENTS

| | | | |
|---|---|---|---|
| 2,922,609 | 1/1960 | Collier | 248/179.1 |
| 3,206,853 | 9/1965 | Esumi et al. | 32/299 |
| 3,699,580 | 10/1972 | Joseph et al. | 343/702 |
| 3,970,274 | 7/1976 | Resk | 248/185 |
| 3,974,994 | 8/1976 | Petterson | 248/23 |
| 4,019,710 | 4/1977 | O'Connor et al. | 248/181 |
| 4,365,779 | 12/1982 | Bates et al. | 248/371 |
| 4,415,136 | 11/1983 | Knoll | 248/181 |
| 4,533,105 | 8/1985 | Cornwell, Jr. et al. | 248/371 |
| 4,547,027 | 10/1985 | Scheibenreif | 339/8 R |
| 4,645,153 | 2/1987 | Granzow et al. | 248/178 |
| 4,832,419 | 5/1989 | Mitchell et al. | 312/7.2 |
| 4,880,191 | 11/1989 | Lake, Jr. | 248/371 |
| 5,016,849 | 5/1991 | Wu | 248/183 |
| 5,108,062 | 4/1992 | Detwiler | 248/185 |
| 5,209,446 | 5/1993 | Kawai | 248/349 |
| 5,379,274 | 1/1995 | Lee | 368/317 |
| 5,398,993 | 3/1995 | Cho | 248/349 |
| 5,520,361 | 5/1996 | Lee | 248/398 |
| 5,603,478 | 2/1997 | Wang | 248/371 |
| 5,623,392 | 4/1997 | Ma | 361/681 |
| 5,632,463 | 5/1997 | Sung et al. | 248/371 |
| 5,687,939 | 11/1997 | Moscovitch | 248/122.1 |
| 5,687,944 | 11/1997 | Shon | 248/349.1 |
| 5,704,581 | 1/1998 | Chen | 248/371 |
| 5,730,406 | 3/1998 | Chen | 248/223.41 |
| 5,765,794 | 6/1998 | Chen | 248/292.12 |
| 5,845,735 | 12/1998 | Cheng | 361/681 |
| 5,870,280 | 2/1999 | Cho | 361/681 |

*Primary Examiner*—Leslie A. Braun
*Assistant Examiner*—Tan Le
*Attorney, Agent, or Firm*—Bacon & Thomas, PLLC

[57] ABSTRACT

A LCD support structure including an upright support having a holder frame at one side, the holder frame having a disk-like support face and at least one first sliding element raised from the support face, and a LCD mounted on the holder frame of the upright support, the LCD having at least one second sliding element raised from a back side thereof and respectively slidably coupled to the at least one first sliding element of the upright support, for permitting the LCD to be turned about a horizontal axis within a predetermined angle.

2 Claims, 4 Drawing Sheets

LCD SUPPORT SYSTEM

BACKGROUND OF THE INVENTION

The present invention relates to a LCD support structure for supporting a LCD on a desk, and more particularly to such a LCD support structure which permits the LCD to be turned within a predetermined angle to fit installation space.

Regular monitors commonly occupy much table space because they use a cathode ray tube for producing pictures. Recently, a variety of LCDs (liquid crystal displays) have been well developed, and are intensively used to replace conventional monitors in for example computer systems. However, either monitors or LCDs, the length breadth ratio of the display screen is 4:3 or 16:9. Because of this length breadth ratio, a LCD occupies much table space. Further, if the length of data surpasses the range of the display screen when processing a form or words in a computer, the form or words cannot be seen wholly from the picture, and up and down keys shall be operated to move the picture. This problem is eliminated if the direction of the display screen can be turned.

SUMMARY OF THE INVENTION

The present invention has been accomplished under the circumstances in view. It is therefore the major object of the present invention to provide a LCD support structure which permits the LCD to be vertically turned about a horizontal axis and set between at the designed angle. According to one aspect of the present invention, the LCD support structure comprises an upright support having a holder frame at one side, the holder frame having a disk-like support face and at least one first sliding element raised from the support face, and a LCD mounted on the holder frame of the upright support, the LCD having at least one second sliding element raised from a back side thereof and respectively slidably coupled to the at least one first sliding element of the upright support, for permitting the LCD to be turned about a horizontal axis within a predetermined angle. According to another aspect of the present invention, the at least one first sliding element of the holder frame can be a post, and the at least one second sliding element of the LCD can be an arched sliding slot respectively slidably coupled to the at least one first sliding element of the holder frame.

DETAILED DESCRIPTION OF THE PREFERRED EMBODIMENT

Figure 1:
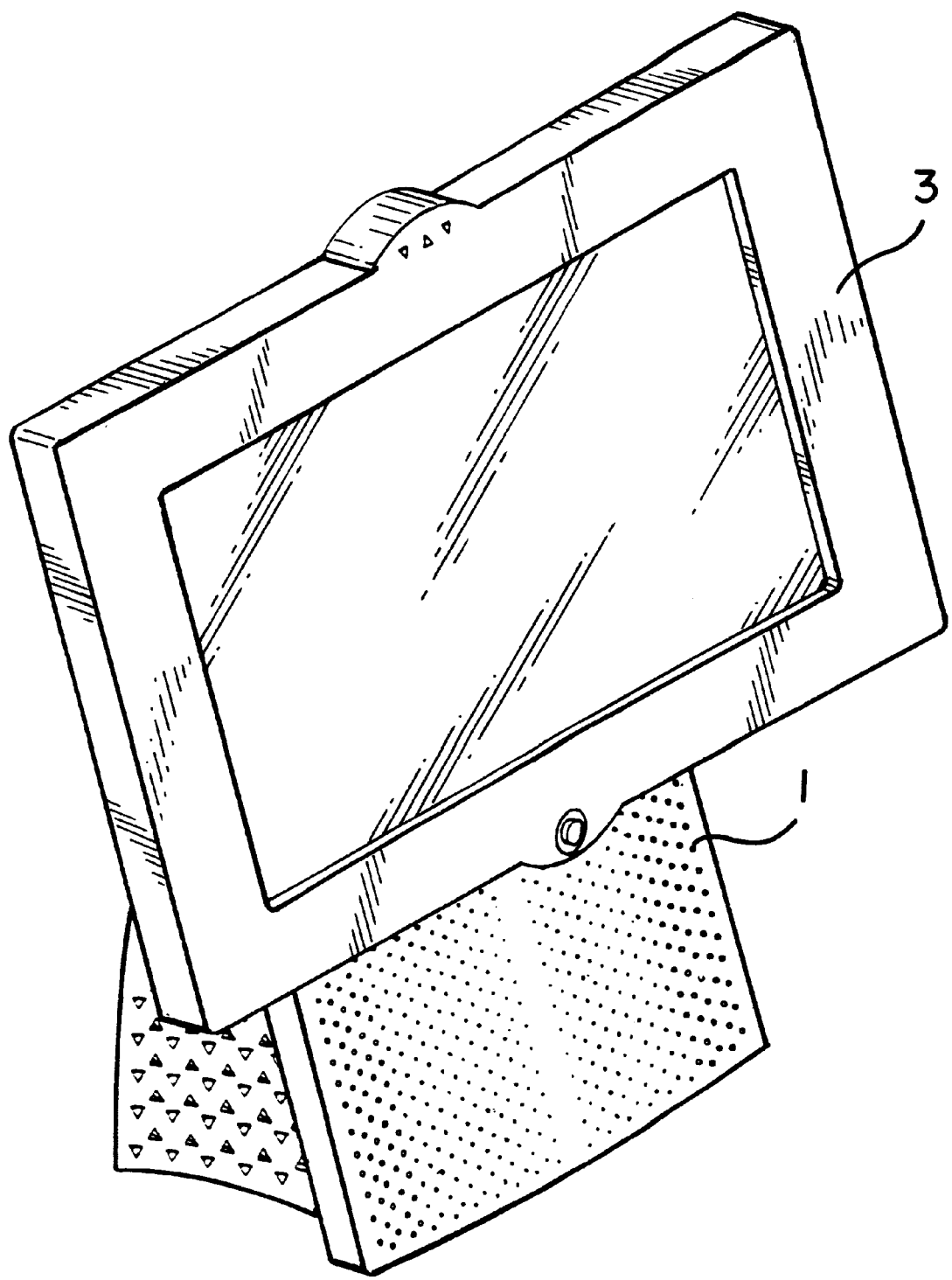
FIG. 1 is an elevational view of the present invention.
Figure 2:
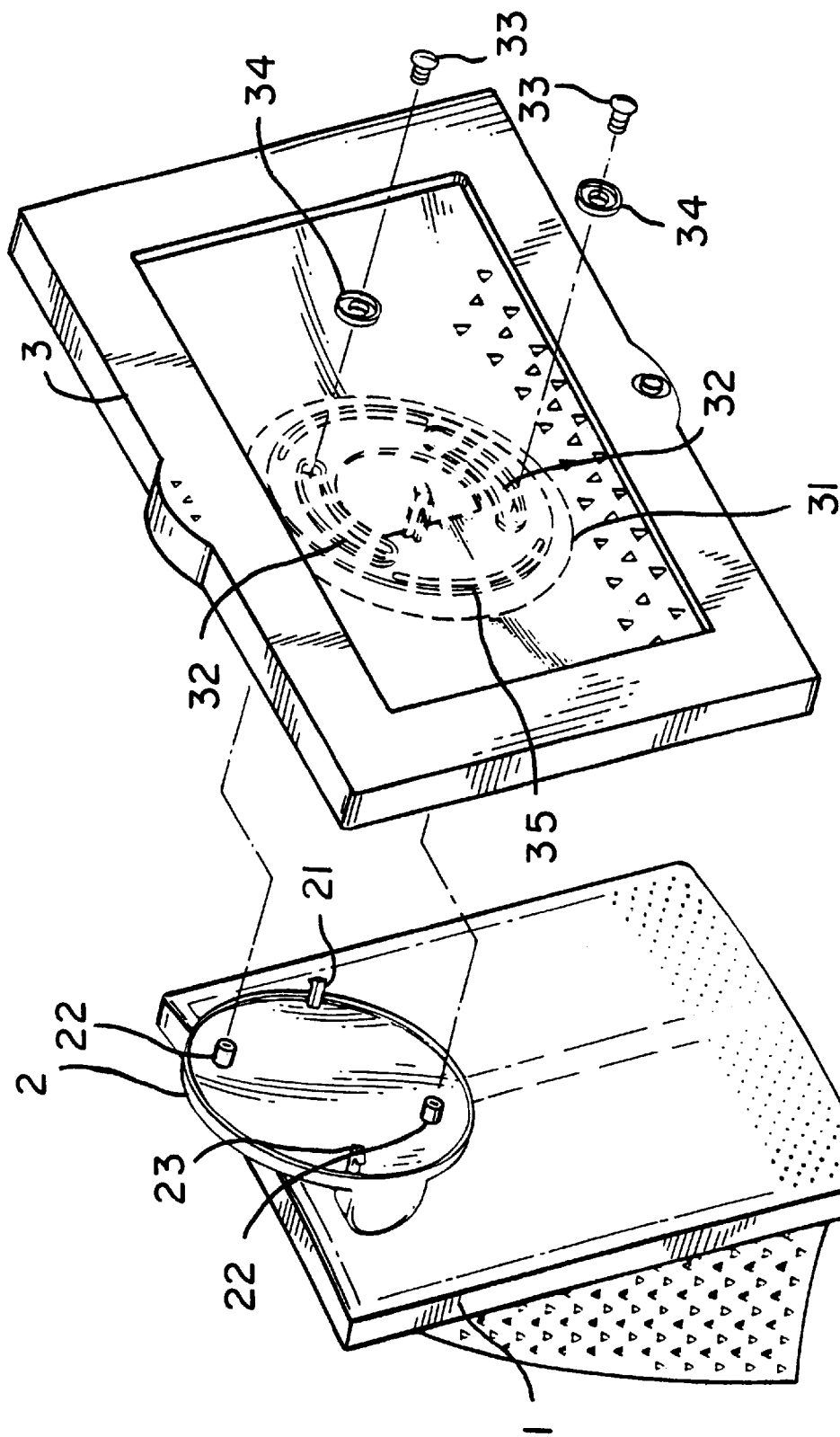
FIG. 2 is an exploded view of the present invention.

Referring to FIGS. 1 and 2, a LCD support structure in accordance with the present invention comprises a hollow, upright support 1, a holder frame 2 fixedly fastened to the upright support 1 at one side near the top by for example screws. The holder frame 2 comprises a disk-like support face 21 curved inwards at one side remote from the upright support 1, a plurality of posts and hooks for example two posts 22 and two hooks 23 raised from the disk-like support face 21 and equiangularly and alternatively spaced around its border. A LCD (liquid crystal display) 3 is mounted on the holder frame 2. The LCD 3 comprises a back recess 31 disposed at the back side of the frame shell thereof and adapted for receiving the disk-like support face 21 of the holder frame 2, two arched locating holes 35 symmetrically disposed at two opposite sides within the back recess 31 and adapted to be forced into engagement with the hooks 23 of the holder frame 2, two arched sliding slots 32 symmetrically disposed at two opposite sides within the back recess 31 between the two arched locating holes 35 and adapted for receiving the posts 22 of the holder frame 2. The arched sliding slots 32 extend through for example 90° angle so that the turning angle of LCD 3 is limited to 90° angle.

Figure 3:
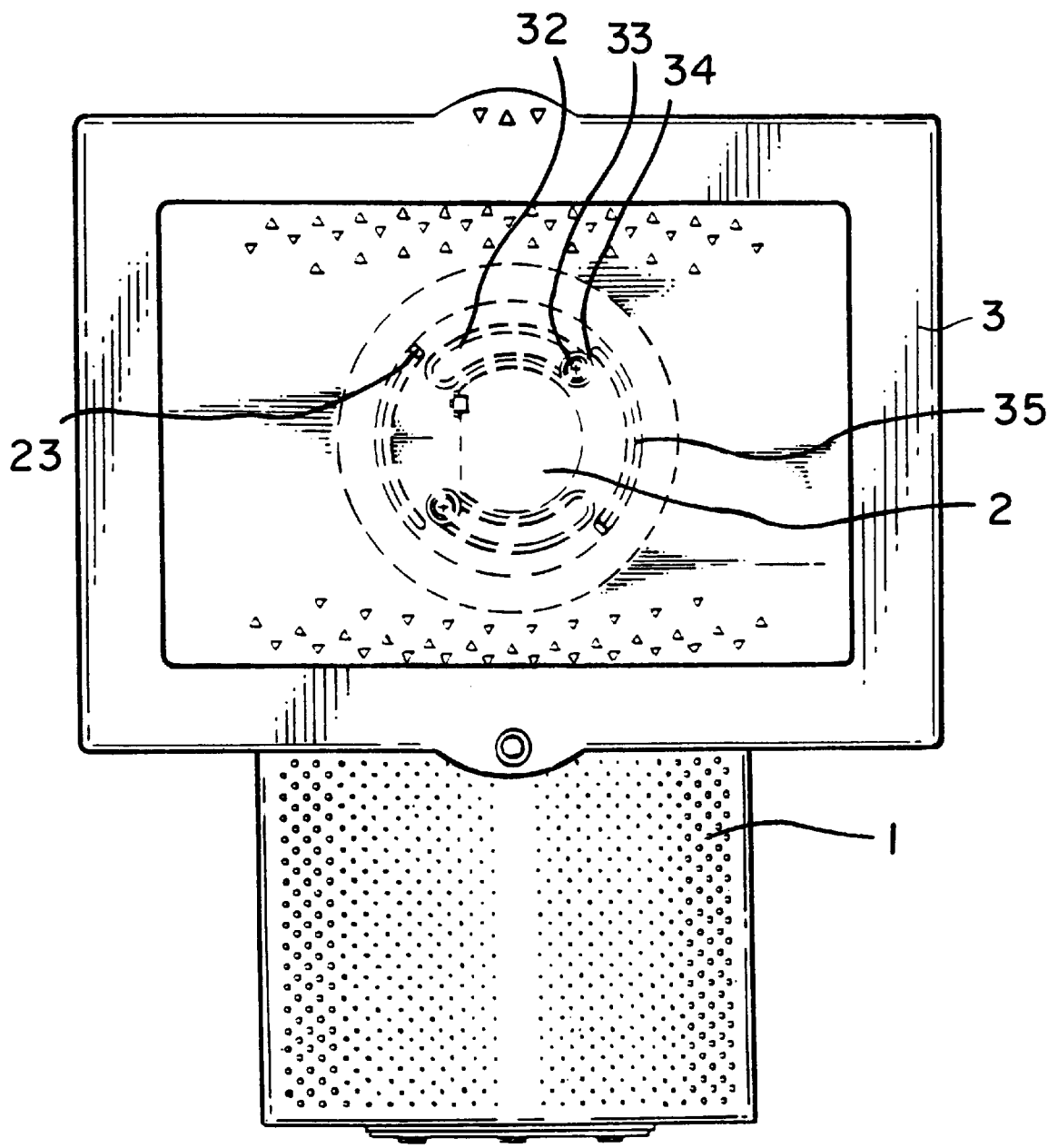
FIG. 3 is front assembly view of the present invention.

Referring to FIG. 3 and FIG. 2 again, when the holder frame 2 is fixedly fastened to the upright support 1, the posts 22 of the holder frame 2 are respectively inserted into the arched sliding slots 32 of the LCD 2, and then screws 3 and washers 34 are fastened to the posts 22 to secure the LCD 3 in place.

Figure 4:
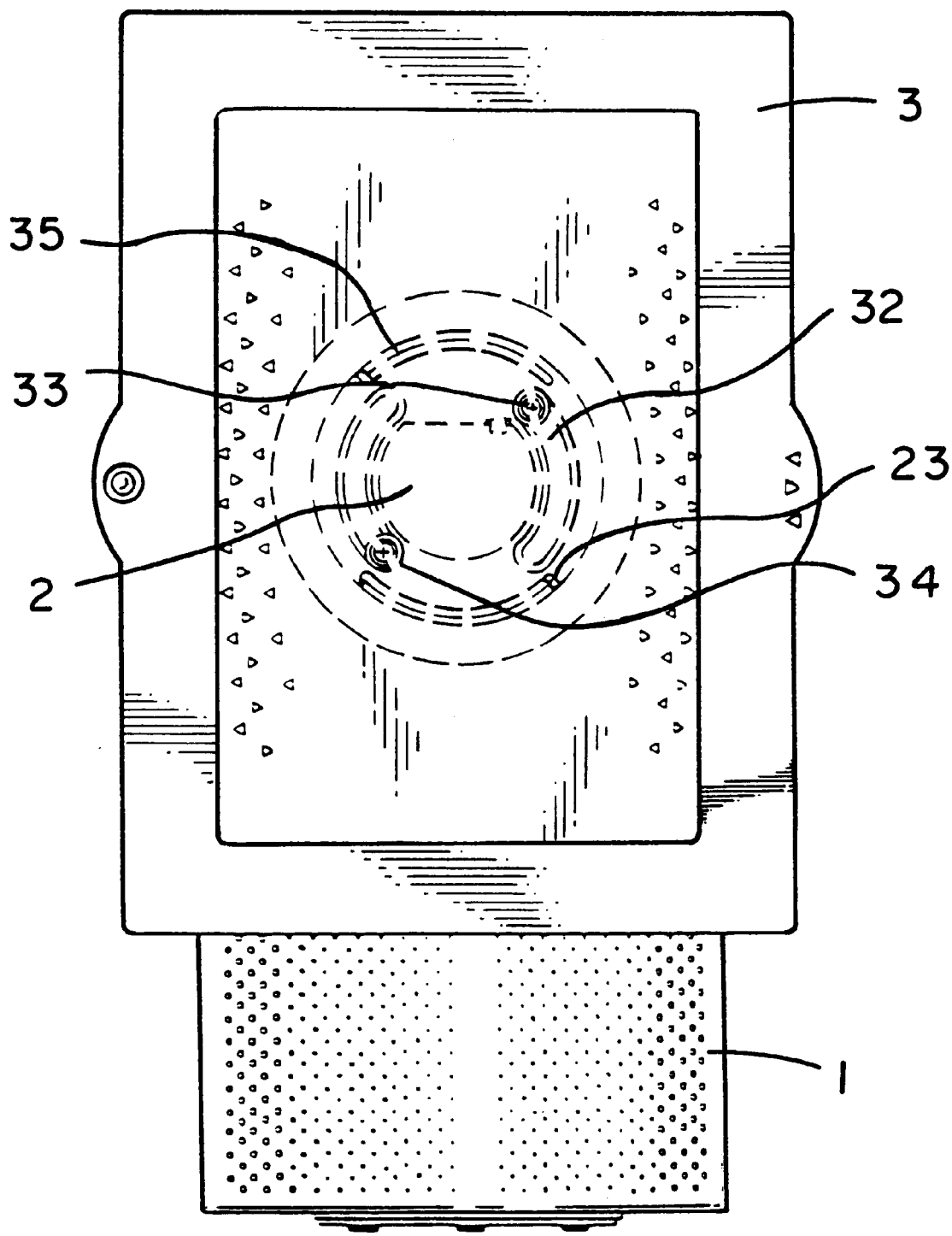
FIG. 4 is an applied view of the present invention, showing the LCD adjusted through 90° angle.

Referring to FIG. 4 and FIG. 3 again, when the LCD 3 is turned from the landscape orientation shown in FIG. 3 to the portrait orientation shown in FIG. 4, i.e., about a horizontal axis extending perpendicularly to the display screen of the LCD display, the arched slots 32 are moved relative to the posts 22 and the arched locating holes 35 are moved relative to the hooks 23. Because the arched sliding slots 32 and the arched locating holes 35 extend through about 90° angle respectively, the LCD 3 is allowed to be turned within 90° angle, and set in the position shown in FIG. 3 in which the length of the LCD 3 is disposed in a horizontal or landscape orientation, or the position shown in FIG. 4 in which the length of the LCD 3 is disposed in a vertical or portrait orientation. When the LCD 3 is set in the position shown in FIG. 3 or the position shown in FIG. 4, the hooks 23 are respectively forced into engagement with one end of each arched locating hole 35, and the posts 22 are respective stopped at one end of each arched sliding slot 32.

While only one embodiment of the present invention has been shown and described, it will be understood that various modifications and changes could be made thereunto without departing from the spirit and scope of the invention disclosed.

What the invention claimed is:

1. A liquid crystal display (LCD) support structure in combination with an LCD display comprising:

an upright support having a holder frame at one side, said holder frame comprising a support face, and at least one hook-shaped first sliding element raised from said support face;

an LCD mounted on the holder frame of said upright support, said LCD comprising at least one second sliding element having a slot respectively slidably coupled to the at least one hook-shaped first sliding element of said uptight support, for permitting said LCD to be turned at out a horizontal axis within a predetermined angle of 90°, said horizontal axis extending in a direction perpendicular to a screen of the LCD display so that the LCD display can be rotated from a landscape to a portrait orientation.

2. The LCD support structure of claim 1 wherein said support face of said holder frame is a disk-like inwardly-curved face having at least one post-shaped sliding element mounted on it for slidable engagement with a at least one additional slot in said LCD.

* * * * *